United States Patent
Haskell et al.

(10) Patent No.: US 8,228,991 B2
(45) Date of Patent: Jul. 24, 2012

(54) SYSTEM AND METHOD FOR ADAPTIVE VIDEO COMPRESSION MOTION COMPENSATION

(75) Inventors: Paul Eric Haskell, Saratoga, CA (US); Andrew W. Johnson, Cupertino, CA (US); Damien Kessler, Sunnyvale, CA (US)

(73) Assignee: Harmonic Inc., San Jose, CA (US)

( * ) Notice: Subject to any disclaimer, the term of this patent is extended or adjusted under 35 U.S.C. 154(b) by 1340 days.

(21) Appl. No.: 11/858,672

(22) Filed: Sep. 20, 2007

(65) Prior Publication Data

US 2009/0080525 A1 Mar. 26, 2009

(51) Int. Cl.
*H04N 7/12* (2006.01)

(52) U.S. Cl. .................................. 375/240.16

(58) Field of Classification Search ........................ None
See application file for complete search history.

(56) References Cited

U.S. PATENT DOCUMENTS

| | | | |
|---|---|---|---|
| 5,227,878 A * | 7/1993 | Puri et al. | 375/240.15 |
| 5,377,051 A * | 12/1994 | Lane et al. | 386/314 |
| 5,576,902 A * | 11/1996 | Lane et al. | 386/343 |
| 5,729,648 A * | 3/1998 | Boyce et al. | 386/314 |
| 6,363,207 B1 * | 3/2002 | Duruoz et al. | 386/200 |
| 6,519,287 B1 * | 2/2003 | Hawkins et al. | 375/240.16 |
| 6,931,071 B2 * | 8/2005 | Haddad et al. | 375/240.28 |
| 7,545,293 B2 * | 6/2009 | Reznik | 341/67 |
| 7,733,958 B2 | 6/2010 | Su et al. | |
| 8,050,324 B2 | 11/2011 | Yu et al. | |
| 2003/0035478 A1 * | 2/2003 | Taubman | 375/240.11 |
| 2003/0037335 A1 * | 2/2003 | Gatto et al. | 725/86 |
| 2003/0043924 A1 * | 3/2003 | Haddad et al. | 375/240.28 |
| 2003/0044166 A1 * | 3/2003 | Haddad | 386/111 |
| 2003/0086000 A1 * | 5/2003 | Siemens et al. | 348/148 |
| 2003/0106063 A1 * | 6/2003 | Guedalia | 725/90 |
| 2004/0008775 A1 * | 1/2004 | Panusopone et al. | 375/240.12 |
| 2006/0165301 A1 * | 7/2006 | Cha et al. | 382/240 |
| 2007/0033494 A1 * | 2/2007 | Wenger et al. | 714/776 |
| 2007/0092147 A1 | 4/2007 | Guionnet et al. | |
| 2007/0116125 A1 * | 5/2007 | Wada et al. | 375/240.16 |
| 2007/0133679 A1 * | 6/2007 | Yang et al. | 375/240.07 |
| 2007/0195884 A1 | 8/2007 | Sakamoto | |
| 2008/0063065 A1 | 3/2008 | Lin | |
| 2008/0111721 A1 * | 5/2008 | Reznik | 341/67 |
| 2008/0111722 A1 * | 5/2008 | Reznik | 341/67 |
| 2008/0123733 A1 * | 5/2008 | Yu et al. | 375/240.01 |
| 2011/0090963 A1 | 4/2011 | Po et al. | |
| 2011/0110429 A1 | 5/2011 | La et al. | |

FOREIGN PATENT DOCUMENTS

| | | |
|---|---|---|
| EP | 1802125 A1 | 6/2007 |
| WO | WO 2006/012382 | 2/2006 |
| WO | WO 2008/048864 | 4/2008 |

OTHER PUBLICATIONS

Ezhilarasan, M., et al., "Simplified Block Matching Algorithm for Fast Motion Estimation in Video Compression", Journal of Computer Science, Apr. 1, 2008, Issue 4, vol. 4, pp. 282-289.

* cited by examiner

*Primary Examiner* — Ayaz Sheikh
*Assistant Examiner* — Faiyazkhan Ghafoerkhan
(74) *Attorney, Agent, or Firm* — Fish & Richardson P.C.

(57) ABSTRACT

Methods and systems for video coding are provided. A method includes receiving a digital video stream. The digital video stream includes multiple sequential independent frames. The method further includes storing a first frame of the digital video stream. The method also includes encoding a second frame of the digital video stream using motion compensation with the stored first frame as a reference.

21 Claims, 4 Drawing Sheets

SYSTEM AND METHOD FOR ADAPTIVE VIDEO COMPRESSION MOTION COMPENSATION

TECHNICAL FIELD

This disclosure relates to digital signal processing.

BACKGROUND

Conventional digital video encoding includes the compression of a source video using a compression algorithm. The Moving Picture Experts Group (MPEG)-1, MPEG-2, H.261, H.262, H.263 and H.264 video coding standards each describe a syntax of the bitstream that is generated following application of the compression algorithm to the source video. The data in video streams is often redundant in space and time, thus video streams may be compressed by removing the redundancies, and encoding only the differences. For example, a blue sky background across the top of a picture may persist for several frames of a video stream, while other objects move in the foreground. It would be redundant to encode the background of each frame since it remains the same. The moving foreground objects also have redundancies. For example, a jet airplane that moves across a frame may appear the same from frame to frame, with only its position changing. In this case, the jet airplane does not need to be encoded in every frame, only its change in position needs to be encoded.

SUMMARY

The disclosure provides various embodiments of systems and methods for video coding. In one embodiment, A method includes receiving a digital video stream. The digital video stream includes multiple sequential independent frames. The method further includes storing a first frame of the digital video stream. The method also includes encoding a second frame of the digital video stream using motion compensation with the stored first frame as a reference.

The foregoing—as well as other disclosed—example methods may be computer implementable. Moreover some or all of these aspects may be further included in respective processes, computer implemented methods, and systems for video coding.

The processes, computer implemented methods, and systems may also include determining a motion-predicted picture using the stored first picture as a reference, subtracting the motion-predicted picture from the second picture to generate a difference, and encoding the difference. They may also include quantizing the first picture, de-quantizing the quantized first picture, creating a reconstructed first picture from the de-quantized first picture; and storing the reconstructed first picture. Encoding the second picture may include determining a first motion-predicted picture based on the stored reconstructed first picture as a reference; determining a second motion-predicted picture based on the stored first picture as a reference; determining a resulting motion-predicted picture using the first and the second motion-predicted pictures and criteria; subtracting the resulting motion-predicted picture from the second picture to generate a difference; and encoding the difference.

Determining the resulting motion-predicted picture may include selecting between the first and the second motion-predicted pictures using the criteria. Determining the resulting motion-predicted picture may also include blending the first and the second motion-predicted pictures using the criteria. The criteria may be based on a determined quantization noise and a determined mismatch noise. The criteria may also include selecting a signal based on the proximity of encoding an intra-coded picture refresh point. The criteria may also include determining whether a mismatch noise threshold is exceeded.

The picture may include multiple regions, and the criteria may be determined by the region of the plurality of regions that is being encoded. Each of the multiple regions may be a macroblock. The criteria may be based on the amount of motion associated with each of the multiple regions. The criteria may be based on the amount of quantization noise associated with each of the multiple regions. The criteria may be based on the spatial characteristics of each of the plurality of regions. The first picture may be a first macroblock and the second picture may be a second macroblock.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
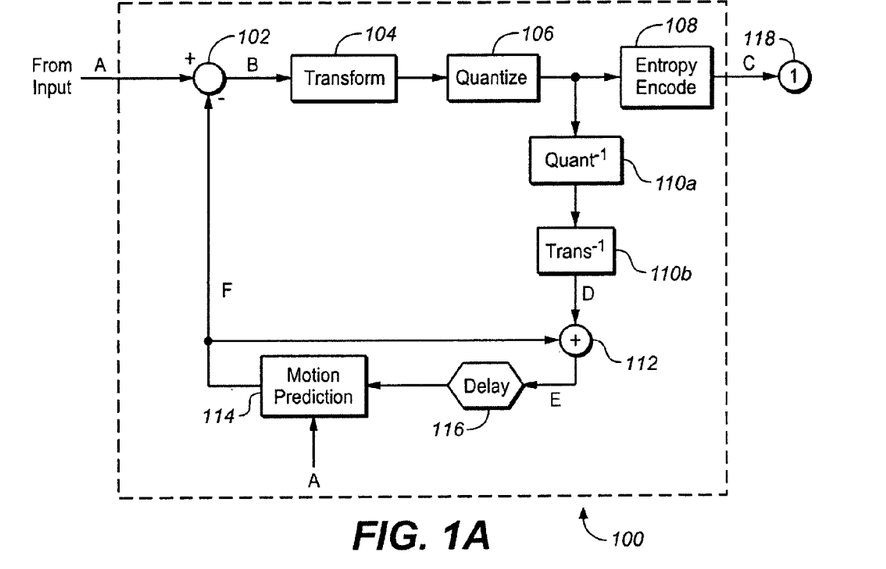
FIGS. 1A and 1B are signal processing diagrams for a conventional video encoder and a conventional video decoder.

Motion compensated inter-frame predictive (MC-prediction) coding is a tool for video compression that takes advantage of the time redundancy present in video streams. Referring now to FIG. 1A, a conventional video encoder 100 is shown. Video encoder 100 can be any of a number of conventional encoders including those that support the MPEG-1, MPEG-2, H.261, H.262, H.263, and H.264 video coding standards. Video encoder 100 encodes an input video signal A using a MC-prediction coding to produce an encoded output signal or encoded stream C. The video stream A may include multiple independent frames in time-sequential order. Independent in this context means that each frame is self-contained and does not rely on or reference another frame.

Video encoder 100 includes an encoding path and a feedback path. The encoding path includes a mixer 102, a discrete cosine transform (DCT) block 104, quantization block 106 and an entropy encoder block 108. The feedback path includes an inverse quantization block 110a, inverse DCT block 110b, mixer 112, delay element 116, and motion prediction block 114.

Input signal A is received at mixer 102 where an encoder motion prediction signal Fe is subtracted to produce an encoder residual signal B, which may be referred to as the error signal B. Signal B is provided as an input to the DCT transform block 104. The transformed residual signal is quantized in quantization block 106 producing a quantized encoder residual signal. This block introduces error, specifically quantization noise, between the encoder input signal and the encoders' coded and reconstructed input signal. The quantized encoder residual signal is provided as an input to the entropy encoder block 108, which in turn produces an encoded stream, C. The entropy encoder block 108 operates to code the motion compensated prediction residual (i.e., error signal embodied in the encoder residual signal B) to further compress the signal and may also produce a bit stream that is compliant with a defined syntax (e.g., coding standard). The encoded stream C can be provided as an input to a transmission source that in turn can transmit the encoded stream to a downstream device where it may be decoded and the underlying source video input reconstructed.

The feedback path includes a motion prediction block 114 that decides how best to create a version of the current frame of video data using pieces of the past frame of video data. More specifically, the quantized encoder residual signal is also provided as an input to an inverse quantization block 110a in the feedback path. The output of the inverse quantization block 110a is an inverse quantized transformed encoder residual signal. The inverse quantization block 110a seeks to reverse the quantization process to recover the transformed error signal. The output of the inverse quantization block 110a is provided as an input to the inverse DCT block 110b that in turn produces recovered encoder residual signal D. The inverse DCT block 110b seeks to reverse the transform process invoked by DCT block 104 so as to recover the error signal. The recovered error signal D is mixed with the output of the motion prediction block 114 (i.e., encoder motion prediction signal F) producing the reconstructed input video signal E. The reconstructed input video signal E is provided as an input to the delay element 116. The delay imparted by delay element 116 allows for the alignment of frames in the encoding path and feedback path (to facilitate the subtraction performed by mixer 102). The delayed reconstructed encoder signal is provided as a past frame input to motion prediction block 114.

Motion prediction block 114 has two inputs: a reconstructed past-frame input (i.e., delayed reconstructed encoder signal) and a current-frame input (i.e., input video signal A). Motion prediction block 114 generates a version of the past-frame input that resembles as much as possible (i.e., predicts) the current-frame using a motion model that employs simple translations only. Conventionally, a current frame is divided into multiple two-dimensional blocks of pixels, and for each block, motion prediction block 114 finds a block of pixels in the past frame that matches as well as possible. The prediction blocks from the past frame need not be aligned to a same grid as the blocks in the current frame. Conventional motion estimation engines can also interpolate data between pixels in the past frame when finding a match for a current frame block (i.e., sub-pixel motion compensation). The suitably translated version of the past-frame input is provided as an output (i.e., encoder motion prediction signal F) of the motion prediction block 114.

The prediction generated from a previously encoded reconstructed frame of video is subtracted from the input in a motion compensation operation (i.e., by mixer 102). Compression takes place because the information content of the residual signal (i.e., encoder residual signal B) typically is small when the prediction closely matches the input. The motion compensated prediction residual is transformed, quantized and then coded as discussed above to produce a bit stream.

The nonzero signal in the motion predicted residual (i.e., encoder residual signal B) originates from three primary sources: motion mismatch, quantization noise and aliasing distortion.

The motion prediction (i.e., encoder motion prediction signal F) is a piecewise approximation of the input. The motion prediction is generated assuming motion between frames is simple and translational. Motion mismatch is the difference between the assumed motion model and true motion between input and reference frames.

The motion prediction of encoder 100 includes quantization noise. More specifically, the motion prediction signal (i.e., encoder motion prediction signal F) contains quantization noise due to the motion prediction being performed on imperfectly encoded past video frames.

Aliasing distortion arises from the conventional interpolation filters (not shown) used in the motion prediction block 114 to generate sub-pixel precision motion predictions. The interpolation filters introduce aliasing distortion in the prediction when the prediction is extracted using sub-pixel motion vectors. The magnitude of this distortion component is dependent upon the spatial frequency content of the signal being interpolated and the stop band attenuation characteristics of the filter used to perform the interpolation.

Figure 1B:
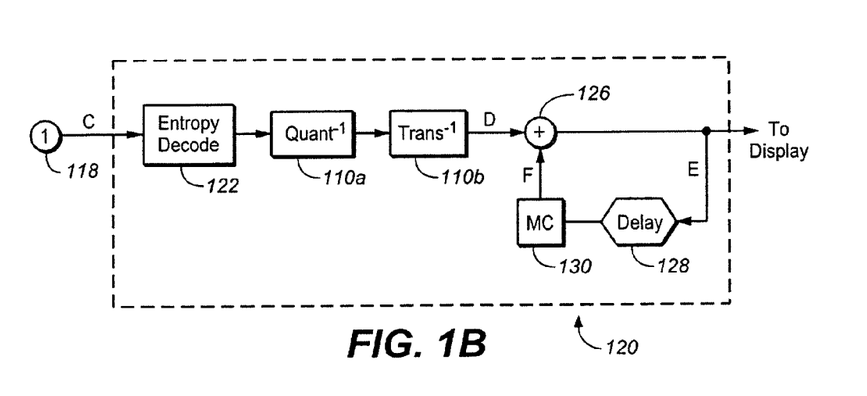

Referring now to FIG. 1B, a conventional video decoder 120 is shown. Video decoder 120 can be any of a number of conventional decoders including those that support the MPEG-1, H.261, H.262, H.263, and H.264 video coding standards. Video decoder 120 decodes encoded video signal C to produce a reconstructed output signal or output stream E. The video decoder 120 includes an entropy decoder block 122, an inverse quantization block 110a, inverse DCT block 110b, mixer 126, delay element 128, and motion compensation block 130. Assuming there are no extraneous errors introduced, for example, in a transmission path between the encoder and decoder, the signals C, D, E, and F are identical to the similarly named signals shown in the encoder 100 of FIG. 1A. With the exception of the motion compensation block 130, the elements and signals match the elements and signals of the feedback path of the encoder 100. The motion compensation block 130, receives as input delayed reconstructed output frames in signal E and the motion vectors (not shown) that were determined by the motion predictor 114 of the encoder 100. By adding the motion vectors for a current frame to the reconstructed output of a previous frame, the motion prediction signal F may be generated and added to the error signal D to determine the reconstructed output E.

Figure 2:
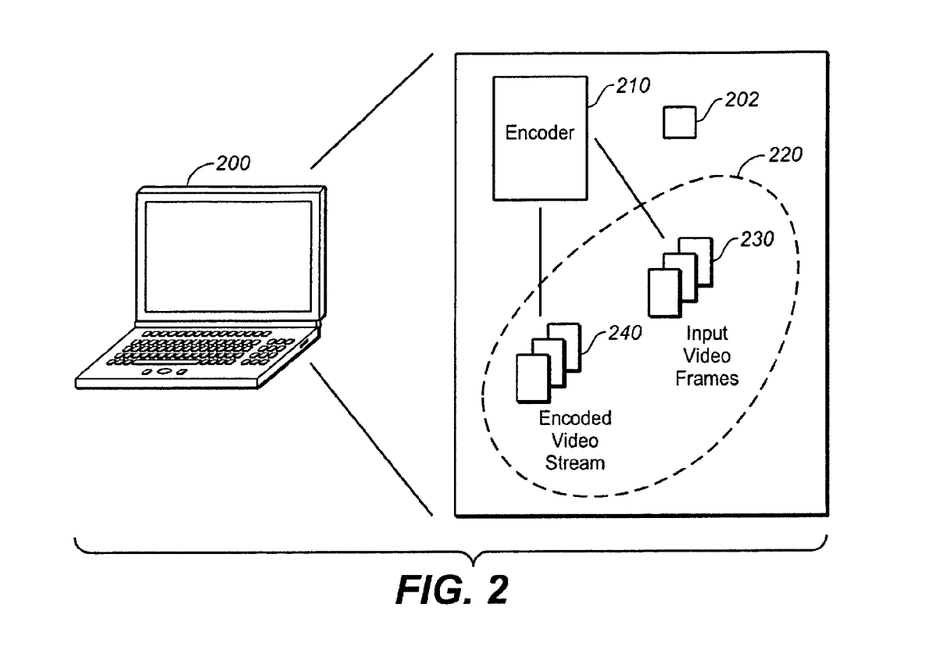
FIG. 2 illustrates an example adaptive video coding system, including a processor and encoder.

FIG. 2 illustrates an example adaptive video coding system, including a processor and encoder. As shown in FIG. 2, system 200 includes an adaptive encoder 210 implemented on a processor 202, and a memory 230 storing input video frames 230 and an encoded video stream 240. Generally, adaptive encoder 210 implements motion compensated interframe predictive coding (MC-prediction coding) using the original input video frames 230 in conjunction with and/or instead of reconstructed video frames in performing motion compensation. The processor 202 may execute a computer program to implement the functionality of the encoder 210.

Figure 3A:
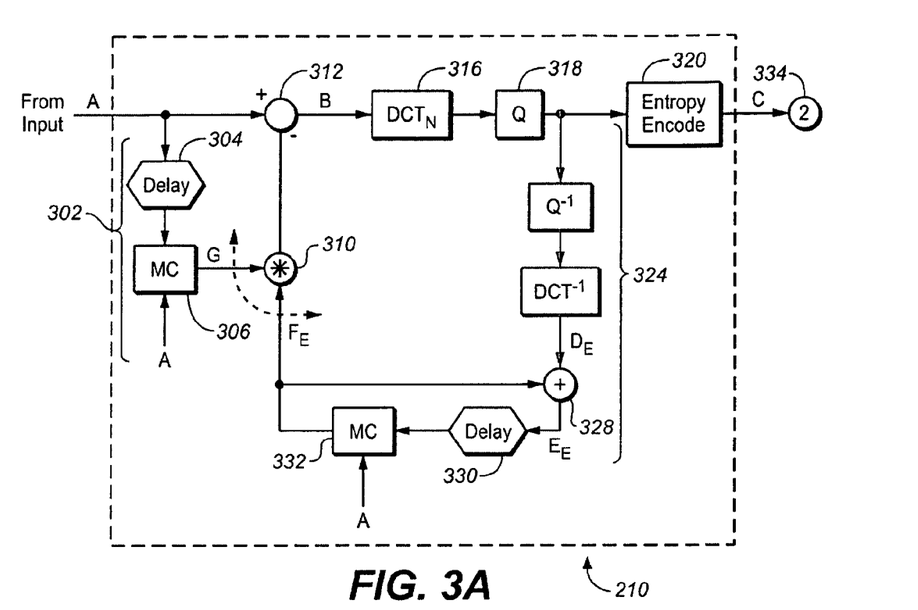
FIGS. 3A and 3B are signal processing diagrams for an example adaptive video encoder and a conventional video decoder.
Figure 3B:
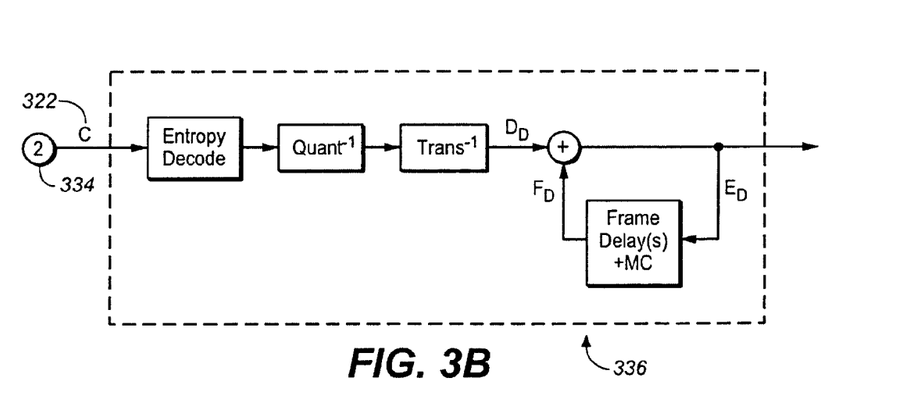

FIGS. 3A and 3B are signal processing diagrams for an adaptive video encoder (e.g., adaptive encoder 210) and a conventional video decoder. As shown in FIG. 3A, an adaptive encoder 210 may include an encoding path having a mixer 312, a discrete cosine transform (DCT) block 316, a quantization block 318, and an entropy encode block 320; and may include a feedback path having a first feedback branch 302, and a second feedback branch 324. The adaptive encoder 210 may include the first feedback branch 302, which is not present in a conventional encoder as described in FIG. 1A. MC-prediction coding may be facilitated by using either of or a combination of the first (at 302) and/or second (at 324) feedback branches. The second feedback branch 324 operates on a reconstructed input signal Ee, which is equivalent to the similarly named signal of the conventional encoder shown in FIG. 1A. The first feedback branch 302, in contrast, operates on the original input signal A. Each of the two signals, Fe and G, produced from the two feedback branches (at 324 and 302) respectively, may be used in mixer 310 separately or together. By using signal G, at least in part, to perform MC-prediction coding, encoder 210 may reduce quantization noise. In addition, the use of signal G may reduce the number of bits required to encode motion compensated predicted and/or bidirectional predicted pictures, together referred to generally as predicted pictures. Predicted pictures in some standards are referred to as P- and/or B-frames. The bits that are saved by coding the predicted pictures in this manner could be used to improve the quality of other pictures.

An encoder residual signal B is produced by subtracting (at 312), from input signal A, an encoder motion estimation signal G, Fe, or some combination of the two. A conventional encoder uses Fe in the feedback loop, which in the case of a conventional encoder, matches the F of a conventional decoder (see FIGS. 1A and 1B) or Fd as shown in FIG. 3B. The signal Fe, however, has quantization-induced compression distortion, also referred to as quantization noise. This noise is introduced in the reconstructed residual signal D after the residual signal B has been quantized and de-quantized, because quantization is a lossy process. The quantization noise in signal D is incorporated into signal E, which is reflected in signal Fe. The quantization noise present in Fe thus may appear in the signal B. The quantization noise may be modeled as the addition of a noise source at Fe. This noise can accumulate in the encoder loop, and therefore in the decoder loop. The encoder may have to spend bits encoding this noise, as it may be mixed into B along with the input signal A. In contrast, signal G, which is derived from the original input A and not the reconstructed input Ee, may not suffer from quantization noise. Signal B derived from Fe may contain more energy (from quantization noise) than B derived from G, and thus B derived from Fe may require more bits to encode.

If, however, the encoder uses G instead of Fe, then a conventional decoder 336 (FIG. 3B), which may use signal Fd and may have no access to signal G, may be mismatched to the encoder. This mismatch may be modeled as a noise signal, called the "mismatch noise," added at Fd (FIG. 3B). At the decoder 336, this mismatch may appear as random noise in the decoded pictures. The difference between Fd and G, which is the mismatch noise, may accumulate within the decoder 336 over time.

Figure 4:
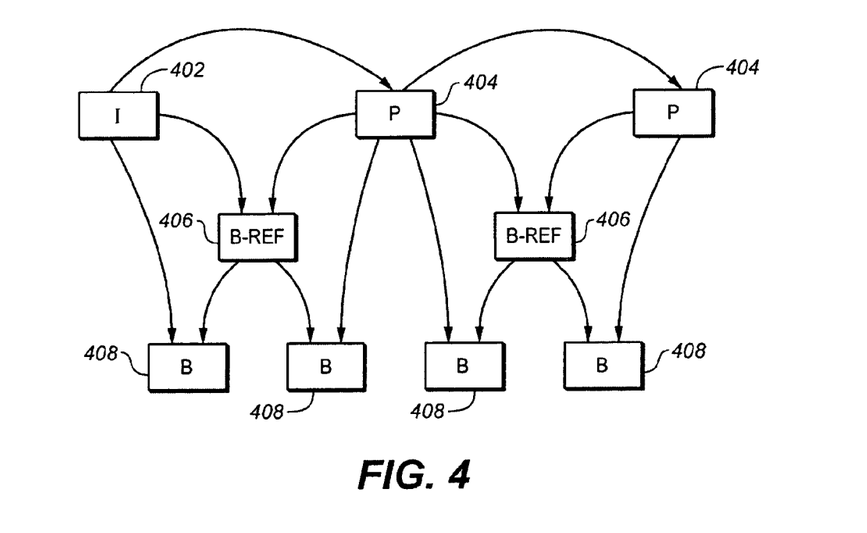
FIG. 4 is an illustration of the interrelation of various pictures according to an example video coding standard.

The efficiency gains obtained from not coding the quantization noise in B may outweigh the cost of the mismatch noise generated by using G. For example, the Moving Picture Experts Group (MPEG)-4/AVC or H.264 encoding standard supports Hierarchical group of pictures (GOP) structures, in which some pictures may be used as motion compensation references only for a few nearby pictures. FIG. 4 is an illustration of the interrelation of various pictures according to an example video coding standard. Referring to FIG. 4, only a few B pictures 408 are encoded using each B-ref reference picture (B-ref) 406. Thus, the likelihood for mismatch noise to accumulate over many pictures may be reduced. If the B-refs 406 contain an appreciable amount of quantization noise, then the B pictures 408 may be encoded using the original pixel data for the B-refs 406 rather than the reconstructed picture, as with conventional encoders. The B pictures 408 may thus require fewer bits to encode, and the mismatch noise introduced may be less objectionable than the noise introduced if reconstructed B-ref pictures were used. The bits saved coding the B pictures may be used to improve the quality of other pictures, possibly resulting in an overall benefit.

An encoder 210 may also be configured to limit the accumulation of mismatch noise by adjusting its use of intra-coded pictures, motion-compensated (MC) predicted reference pictures, and MC predicted non-reference pictures. For example, the encoder may use signal G increasingly as the encoder nears an intra-coded picture refresh point. Doing so may lessen the impact of mismatch noise accumulation as compared to quantization noise, because there may be more accumulation of quantization noise from using Fe over several frames. An encoder 210 may estimate the quantization noise present in a coded picture from properties of the picture and from the quantization step sizes used to compress the picture.

In another example, a video encoder 210 may use G for several pictures and, before reaching a mismatch noise threshold, may use Fe for one or more frames to limit error propagation—even without an intra-coded picture refresh. The encoder 210 may accomplish this by reducing the quantization step size enough to eliminate the mismatch noise propagation. The mismatch noise may be measured by calculating Fe and G for each coded picture and calculating the difference between Fe and G.

In yet another example, the video encoder 210 may use a blend of signals Fe and G, using for example, the following equation:

$$\alpha*Fe+(1-\alpha)*G \qquad \text{(Equation 1).}$$

The encoder may set a constant $\alpha$ or adaptively determine $\alpha$. For example, the encoder 210 may measure the mismatch noise resulting from the difference between Fe and G calculated for a given coded picture or series of pictures. The encoder 210 may use the measured mismatch noise along with any measured quantization noise to determine $\alpha$, such as varying $\alpha$ so as to minimize the total of mismatch and quantization noise. The encoder 210 may set $\alpha$ to a constant 0.5 in order to use an equal blend of the signals Fe and G.

The video encoder 210 may determine and apply different combinations of Fe and G to the different sub-regions of a picture, such as picture macroblocks, rather than using a single combination for all the sub-regions of a picture. This determination may be based on a variety of factors. For example, the encoder 210 may make the determination based on the amount of motion in a particular sub-region. As another example, the encoder 210 may determine that one signal or combination is appropriate based on a sub-region's spatial characteristics, such as the amount of detail in the sub-region or the sub-region's overall brightness. In yet another example, the encoder 210 may make the determination based on the amount of quantization noise in a sub-region.

The encoder 210 may combine various aspects of the above examples in certain embodiments. For example, the encoder may adaptively control $\alpha$ in Equation 1 based on the measured quantization noise, mismatch noise, and spatial detail, for a particular sub-region or for an entire picture. The encoder may choose between Fe or G based on the brightness and the amount of motion in the entire picture. Many other combinations may be implemented.

Figure 5:
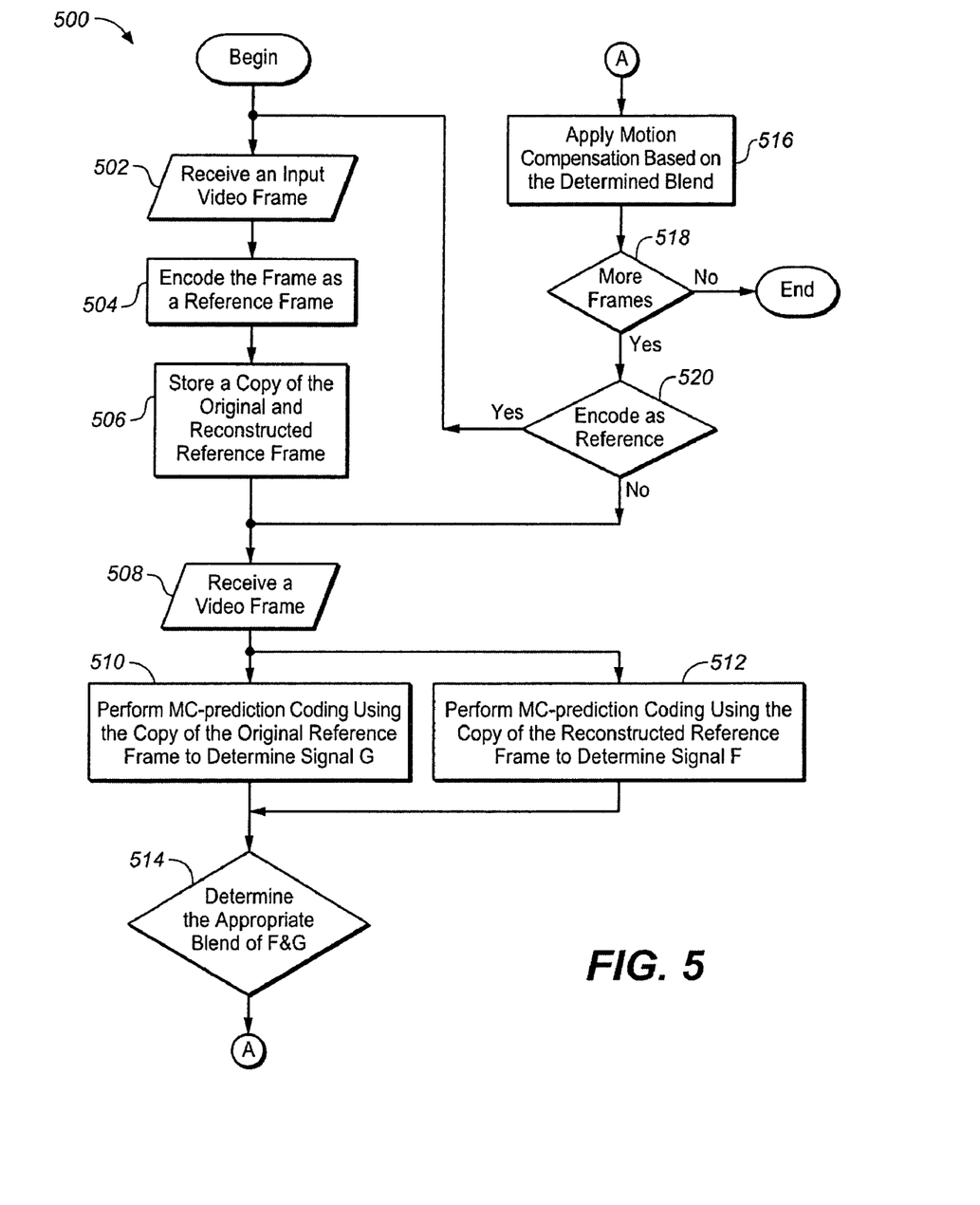
FIG. 5 is a flowchart describing an example process to adaptively encode video.

FIG. 5 is a flowchart describing an example process to adaptively encode video. The process begins at step 502 where an input video frame is received. The input video frame may be received directly from a source or may be received after pre-processing a source video. At step 504, the frame is encoded as a reference frame. There are many types of reference frames depending on the coding standard used. For example, the frame may be an intra-coded picture. The encoding may involve taking the transform and quantizing the reference frame. The encoding may also make use of MC-prediction coding. At step 506, the reference frame is stored. Both a copy of the original reference frame as it was received and a reconstructed version of the reference frame may be stored. The reconstructed version may be obtained by reversing the quantization and transform processes. The reconstructed version of the reference frame may have quantization noise.

At step 508, another video frame may be received. At step 510, MC-prediction coding may be performed on this video using the copy of the original reference frame to determine the motion-compensated reference picture that corresponds to signal G of FIG. 3A. At step 512, the received video frame may be used with the reconstructed reference frame to perform MC-prediction coding resulting in a motion-compensated reference picture that corresponds to signal Fe of FIG. 3A. At step 514, the appropriate blend of the two pictures determined at steps 510 and 512 may be calculated or determined. The blend may be based on the amount of quantization error present in the signal. The blend may be a predetermined constant blend of the two pictures. The blend may be adapted based on the number of times a particular type of encoded frame has been used. There are numerous examples of determining the appropriate blend. The blend may not be an actual blend, in that it may be contain only one of the signals Fe or G.

At step 516, the motion compensation is applied based on the blend determined in step 514. At step 518, a determination is made as to whether there are more frames that need to be encoded. If not, the process ends. Otherwise, at step 520, a determination is made whether to encode another reference frame. If a reference frame is to be encoded, step 502 is executed. Otherwise, step 508 is executed. Process 500 ends when there are no more frames to be encoded.

The terms picture and frame are meant to refer generically to subdivisions of a video that may not correspond directly to their use in a given video coding standards. Likewise, the terms I-, P-, and B-pictures/frames are meant to refer generically regardless of the actual coding standard used. For example, an I-picture/frame refers to an intra-coded picture, that is one that is encoded without using another frame or picture. P- and B-pictures or frames are encoded using other frames or pictures, which may be previous frames, future frames, or both. Those familiar with the art will recognize that terms differ from standard to standard while the overall concepts remain similar. As such, the terms used in this specification should be construed generically and not as pertaining to a particular standard, unless explicitly stated as so pertaining.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. As another example, an adaptive encoder 210 (in FIG. 3A) may include a first feedback branch 302 without a second feedback branch 324.

What is claimed is:

1. A method comprising: receiving a digital video stream comprising a plurality of sequential independent frames; storing a first frame of the digital video stream; and encoding a second frame of the digital video stream using motion compensation including: determining a first motion-compensated reference frame using the stored first frame as a reference; determining a second motion-compensated reference frame using a reconstructed first frame; and applying the motion compensation to the second frame based on the first motion-compensated reference frame and the second motion-compensated reference frame; wherein the stored first frame comprises a first plurality of blocks of pixels and the second frame comprises a second plurality of blocks of pixels and wherein the method further comprises: quantizing the first frame; de-quantizing the quantized first frame; creating the reconstructed first frame from the de-quantized first frame; and storing the reconstructed first frame, wherein the reconstructed first frame comprises a third plurality of blocks of pixels; and wherein encoding the second frame comprises: for one or more blocks of the second plurality, determining a first corresponding block of the first plurality; for one or more blocks of the second plurality, determining a second corresponding block of the third plurality; for one or more blocks of the second plurality, determining a third corresponding block based on predetermined criteria, the first corresponding block, and the second corresponding block; for one or more blocks of the second plurality, determining a difference between at least one block of the second plurality and the third corresponding block; and for one or more blocks of the second plurality, encoding the difference between the at least one block of the second plurality and the third corresponding block.

2. The method of claim 1, wherein the stored first frame comprises a first plurality of blocks of pixels and the second frame comprises a second plurality of blocks of pixels, and wherein encoding the second frame comprises:
   for each block of the second plurality of blocks, determining a corresponding block in the first plurality of blocks that corresponds to the block of the second plurality of blocks;
   for each block of the second plurality of blocks, determining a difference between the block of the second plurality and the determined corresponding block in the first plurality of blocks; and
   for each block of the second plurality of blocks, encoding the difference.

3. The method of claim 1 wherein determining the third corresponding block comprises selecting between the first and the second corresponding blocks using the predetermined criteria.

4. The method of claim 1, wherein the third corresponding block comprises a blending of the first and the second corresponding blocks using the predetermined criteria.

5. The method of claim 1, wherein the predetermined criteria are based on at least one of: a determined quantization noise associated with the first corresponding block, a determined mismatch noise associated with the second corresponding block, a determined number of frames remaining before encoding an intra-coded picture refresh point, or whether a determined mismatch noise associated with the second corresponding block exceeds a predetermined threshold.

6. The method of claim 1, wherein the predetermined criteria used to determine the third corresponding block for each block of the second plurality are based on characteristics of each block of the second plurality.

7. The method of claim 6, wherein the predetermined criteria are based on at least one of a set consisting of: an amount of motion associated with each block of the second plurality, an amount of quantization noise associated with each block of the second plurality, and spatial characteristics of each of the second plurality.

8. The method of claim 1, wherein each block of the second plurality comprises a macroblock.

9. A system comprising: memory storing a plurality of frames of a digital video stream; and one or more processors communicatively coupled to the memory, operable to: receive a first frame of a digital video stream; quantize the first frame; de-quantize the quantized first frame; create a reconstructed first frame from the de-quantized first frame; and receive a second frame, wherein the second frame comprises a first block of pixels; store the received first frame, wherein the stored first frame comprises a second of block of pixels that corresponds to the first block of pixels; store the reconstructed first frame, wherein the reconstructed first frame comprises a third block of pixels that corresponds to the first block of pixels; determine a fourth block of pixels based on a rule, the first corresponding block, and the second corresponding block; and encode the first block using the fourth block; wherein the rule is based on at least one of a set consisting of: a determined quantization noise associated with the third block, a determined mismatch noise associated with the second block, a determined number of frames remaining before encoding an intra-coded picture refresh point, and whether a determined mismatch noise associated with the second block exceeds a predetermined threshold.

10. The system of claim 9, wherein the one or more processors are further operable to determine the fourth block by selecting between the second and the third blocks using the rule.

11. The system of claim 9, wherein the one or more processors are further operable to blend the second and the third blocks using the rule to determine the fourth block of pixels.

12. The system of claim 9, wherein the rule is based on characteristics associated with the first block.

13. The system of claim 12, wherein the characteristics associated with the first block are selected from at least one of a set consisting of: an amount of motion associated with the first block, an amount of quantization noise associated with the first block, and spatial characteristics of the first block.

14. The system of claim 9, wherein the first block of pixels comprises a macroblock.

15. A non-transitory computer readable media storing instructions operable to cause a processor to perform operations comprising: receiving a first frame of a digital video stream; quantizing the first frame; de-quantizing the quantized first frame; creating a reconstructed first frame from the de-quantized first frame; storing the received first frame, wherein the stored first frame comprises a first plurality of blocks of pixels; storing the reconstructed first frame, wherein the reconstructed first frame comprises a second plurality of blocks of pixels; receiving a second frame, wherein the second frame comprises a third plurality of blocks of pixels; for each block of the third plurality of block of pixels, determining a first corresponding block of the first plurality of block of pixels; for each block of the third plurality of block of pixels, determining a second corresponding block of the second plurality of block of pixels; for each block of the third plurality of block of pixels, determining a third corresponding block based on one or more rules, the first corresponding block, and the second corresponding block; for each block of the third plurality of block of pixels, determining a difference between the block of the third plurality of block of pixels and the third corresponding block; and for each block of the third plurality of block of pixels, encoding the difference; wherein the one or more rules are based on at least one of a set consisting of: a determined quantization noise associated with the first corresponding block, a determined mismatch noise associated with the second corresponding block, a determined number of frames remaining before encoding an intra-coded picture refresh point, or whether a determined mismatch noise associated with the second corresponding block exceeds a predetermined threshold.

16. The non-transitory computer readable media of claim 15, wherein the operations further comprise determining the third corresponding block including selecting between the first and the second corresponding blocks using the one or more rules.

17. The non-transitory computer readable media of claim 15, wherein the operations further comprise determining the third corresponding block including blending the first and the second corresponding blocks using the one or more rules.

18. The non-transitory computer readable media of claim 15, wherein the one or more rules correspond to characteristics associated with a block of the third plurality.

19. The non-transitory computer readable media of claim 18, wherein the characteristics comprise at least one of a set consisting of: an amount of motion associated with a block of the third plurality, an amount of quantization noise associated with a block of the third plurality, and spatial characteristics of a block of the third plurality.

20. The non-transitory computer readable media of claim 15, wherein each block of the third plurality is a macroblock.

21. A system, comprising: means for receiving a digital video stream comprising a plurality of sequential independent frames; means for storing a first frame of the digital video stream; means for determining a first motion-compensated reference frame using the stored first frame as a reference; means for determining a second motion-compensated reference frame using a reconstructed first frame; and means for encoding a second frame of the digital video stream by applying motion compensation to the second frame based on the first motion-compensated reference frame and the second motion-compensated reference frame; wherein the stored first frame comprises a first plurality of blocks of pixels and the second frame comprises a second plurality of blocks of pixels and wherein the method further comprises: quantizing the first frame; de-quantizing the quantized first frame; creating the reconstructed first frame from the de-quantized first frame; and storing the reconstructed first frame, wherein the reconstructed first frame comprises a third plurality of blocks of pixels; and wherein encoding the second frame comprises: for one or more blocks of the second plurality, determining a first corresponding block of the first plurality; for one or more blocks of the second plurality, determining a second corresponding block of the third plurality; for one or more blocks of the second plurality, determining a third corresponding block based on predetermined criteria, the first corresponding block, and the second corresponding block; for one or more blocks of the second plurality, determining a difference between at least one block of the second plurality and the third corresponding block; and for one or more blocks of the second plurality, encoding the difference between the at least one block of the second plurality and the third corresponding block.

* * * * *